US009002637B2

(12) United States Patent
Tognoni

(10) Patent No.: US 9,002,637 B2
(45) Date of Patent: Apr. 7, 2015

(54) SYSTEMS AND METHODS FOR GENERATING A NAVIGATION CHART

(71) Applicant: The Boeing Company, Seal Beach, CA (US)

(72) Inventor: Marco Tognoni, Arcola (IT)

(73) Assignee: The Boeing Company, Chicago, IL (US)

( * ) Notice: Subject to any disclaimer, the term of this patent is extended or adjusted under 35 U.S.C. 154(b) by 33 days.

(21) Appl. No.: 13/863,513

(22) Filed: Apr. 16, 2013

(65) Prior Publication Data

US 2014/0309928 A1    Oct. 16, 2014

(51) Int. Cl.
*G01C 21/20*    (2006.01)

(52) U.S. Cl.
CPC .................... *G01C 21/203* (2013.01)

(58) Field of Classification Search
USPC ........................................ 701/425, 409, 533
See application file for complete search history.

(56) References Cited

U.S. PATENT DOCUMENTS

| | | | |
|---|---|---|---|
| 4,590,569 A * | 5/1986 | Rogoff et al. ................. 701/454 |
| 6,112,141 A | 8/2000 | Briffe et al. |
| 6,865,476 B1 * | 3/2005 | Jokerst, Sr. .................... 701/467 |
| 6,885,939 B2 * | 4/2005 | Schmidt et al. ............... 701/428 |
| 8,260,545 B1 | 9/2012 | Aspen et al. |
| 8,296,001 B1 | 10/2012 | Kabel et al. |
| 8,340,837 B2 * | 12/2012 | Aspen ............................... 701/3 |
| 8,359,157 B2 * | 1/2013 | Figueroa ........................ 701/430 |
| 2004/0128070 A1 | 7/2004 | Schmidt et al. |
| 2007/0150125 A1 * | 6/2007 | Aspen ............................... 701/3 |
| 2009/0254268 A1 * | 10/2009 | Figueroa ........................ 701/201 |
| 2009/0303251 A1 * | 12/2009 | Balogh et al. .................. 345/632 |
| 2012/0158287 A1 | 6/2012 | Altamura et al. |

OTHER PUBLICATIONS

Extended European Search Report of Application No. 14164822.0; Dec. 1, 2014; 8 pages.

* cited by examiner

*Primary Examiner* — Mary Cheung
*Assistant Examiner* — Michael Berns
(74) *Attorney, Agent, or Firm* — Armstrong Teasdale LLP

(57) ABSTRACT

In one aspect, a system for generating a navigation chart is provided. The system includes a display device and a computing device coupled to the display device. The computing device is configured to receive at least one of current geographic position data from a navigation instrument and a desired geographic position input by a user and to generate a navigation chart having a geographic area that corresponds to one of the current geographic location and the desired geographic position and that includes at least one navigation aid, the navigation chart includes at least one navigation aid symbol corresponding to a position of the navigation aid within the geographic area. The computing device is further configured to determine whether each navigation aid is visible at a predetermined position within the geographic area and to display the navigation chart on the display device.

18 Claims, 4 Drawing Sheets

SYSTEMS AND METHODS FOR GENERATING A NAVIGATION CHART

BACKGROUND

The field of the disclosure generally relates to navigation charts and, more specifically, to systems and methods for generating a navigation chart for night navigation.

At least some known navigation charts are used to plan and track naval journeys. Initial computer displayed charts have been static and pre-composed versions of traditional paper charts. Dynamic (e.g., real-time), electronically displayed navigation charts have additional challenges in terms of assisting a user during night travel when the user has very few visual references to use during navigation. For example, some known systems do not identify navigation aids (e.g., beacons, buoys, lighthouses) or provide relevant information about the naval aids. Rather, often a mariner must use a reference book to determine the identity of a navigation aid and to assist the mariner in determining his location, which can be difficult and time-consuming. In addition, navigation aid identification and ship location determination can be especially difficult at night.

BRIEF DESCRIPTION

In one aspect, a system for generating a navigation chart is provided. The system includes a display device and a computing device coupled to the display device. The computing device is configured to receive at least one of current geographic position data from a navigation instrument and a desired geographic position input by a user and to generate a navigation chart having a geographic area that corresponds to one of the current geographic location and the desired geographic position and that includes at least one navigation aid, the navigation chart includes at least one navigation aid symbol corresponding to a position of the navigation aid within the geographic area. The computing device is further configured to determine whether each navigation aid is visible at a predetermined position within the geographic area and to display the navigation chart on the display device.

In another aspect, a device for generating a navigation chart is provided. The device includes a display device, an input device configured to receive a geographic location of interest, and a processor coupled to the input device. The processor is programmed to generate a navigation chart having a geographic area that corresponds to the geographic location of interest and that includes at least one navigation aid. The navigation chart includes at least one navigation aid symbol corresponding to a position of the navigation aid within the geographic area. The processor is further programmed to determine whether each navigation aid is visible at a predetermined position within the geographic area and display the navigation chart on the display device.

In yet another aspect, a method for generating a navigation chart having at least one navigation aid is provided. The method includes determining a geographic area of interest, generating a navigation chart having a geographic area that corresponds to the geographic area of interest and that includes at least one navigation aid, and generating at least one navigation aid symbol corresponding to a position of the navigation aid within in the geographic area. The method further includes determining whether each navigation aid is visible at a predetermined position within the geographic area, and displaying the navigation chart on a display device.

DETAILED DESCRIPTION

As described herein, systems and methods are provided that may determine which, if any, navigation aids in a geographic area are visible from specific points within that geographic area. As such, in the exemplary implementation, a navigation chart is generated that displays navigation aids and their attributes when viewed from any given location within the geographic area. Specifically, the navigation chart includes defined routes, symbols, and/or labels that help a user to quickly and safely identify navigation aids and that may be used to confirm present location and/or heading via the generated navigation chart.

In various aspects, systems and methods for displaying a navigation chart are described. Each navigation chart includes a symbol and/or a label for one or more chart features. As used herein, the term "chart feature" refers to a navigation aid entity (e.g., an aeronautical, a terrestrial, and/or a naval navigation aid entity), a physical structure, a geographical feature, a geographical boundary, a geological feature, and/or a user-configured place mark, or any other entity, tangible or intangible, suitable for display within a navigation chart. Navigation aid entities may include, for example, a buoy, a beacon and/or a lighthouse that produces a visible light. The visible light may have a distinct color and/or duration period depending on the direction from which it is viewed. As described herein, the appearance of symbols and/or the content of the labels may be adjusted based on available area within the navigation chart and/or a scale or zoom level of the navigation chart.

Figure 1:
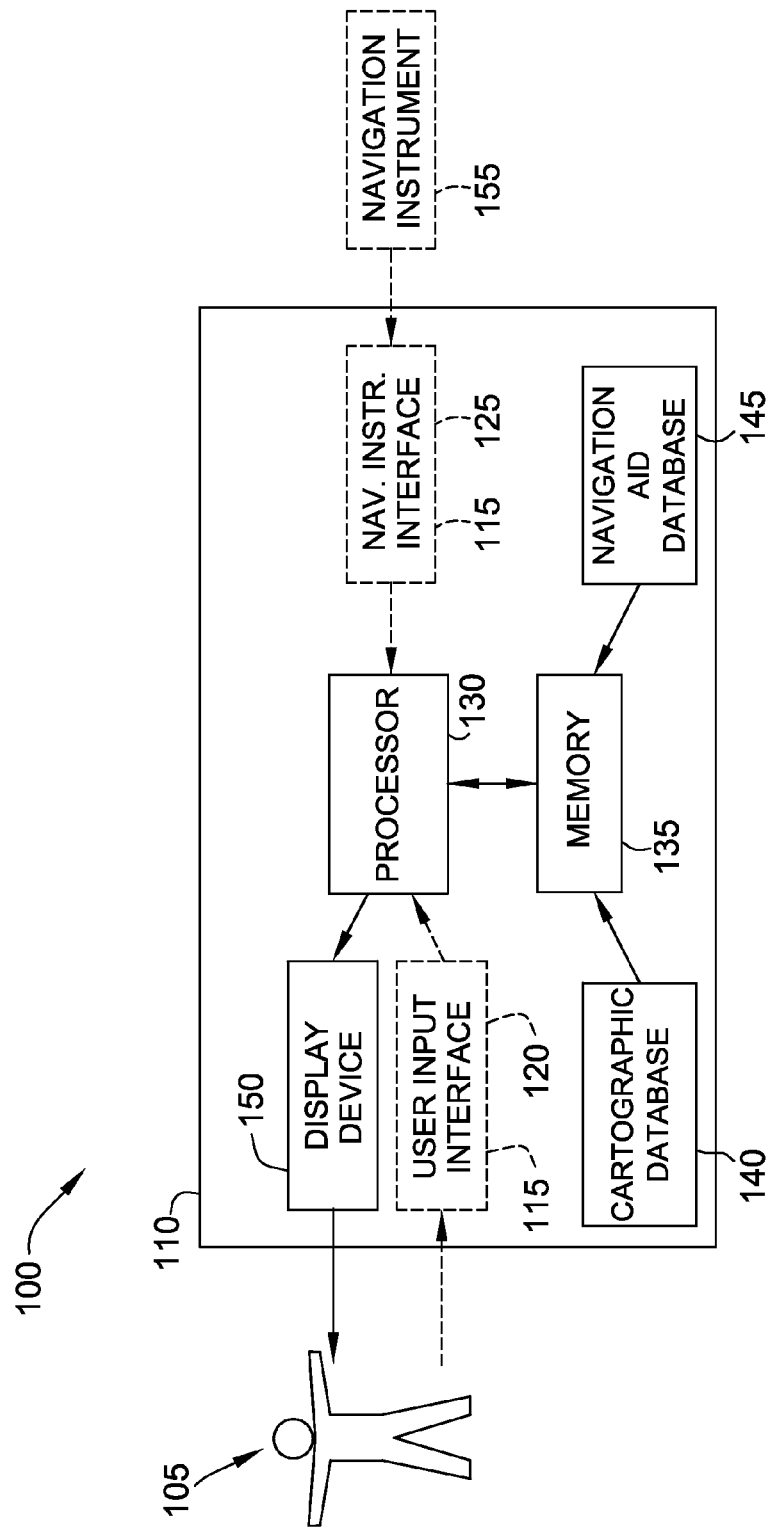
FIG. 1 is a schematic illustration of an exemplary system for use in generating a navigation chart.
Figure 2:
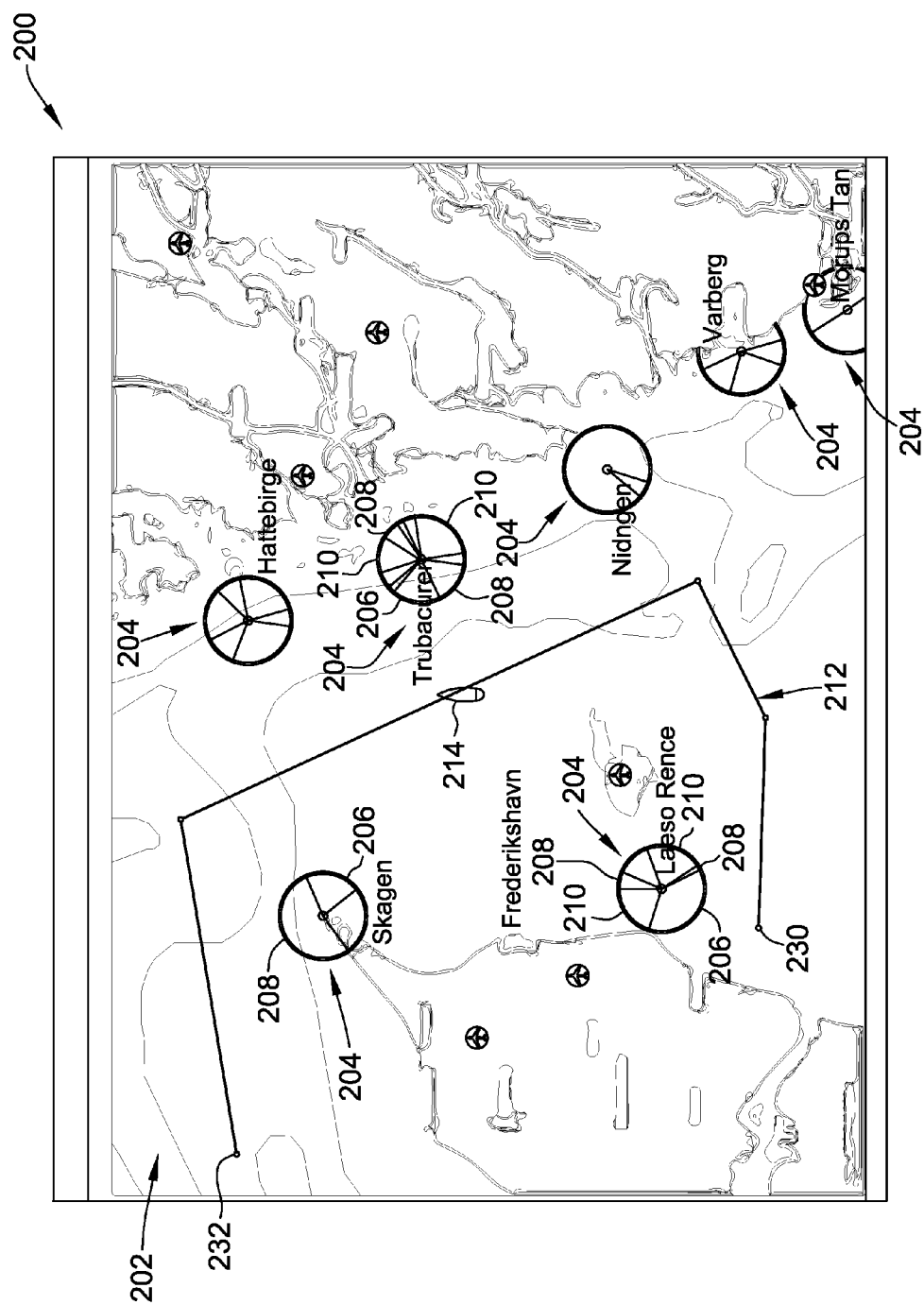
FIG. 2 is an exemplary navigation chart that may be generated by the system shown in FIG. 1.

FIG. 1 is a block diagram illustrating an exemplary system 100 that may be used to display a navigation chart, such as navigation chart 200 shown in FIG. 2. In the exemplary implementation, system 100 may be used, for example, by a user 105, such as a ship captain. System 100 includes a computing device 110 that includes an input device 115, such as a user input device 120 and/or a navigation instrument interface 125. Input device 115 receives a geographic position of interest.

Computing device 110 includes a processor 130 for executing instructions. In some implementations, executable instructions are stored in a memory area 135. Memory area 135 may also include a cartographic database 140 and/or a navigation aid database 145. Computing device 110 is configurable to perform the operations described herein by programming processor 130. For example, processor 130 may be programmed by encoding an operation as one or more executable instructions and providing the executable instructions to processor 130 in memory area 135. Processor 130 may include one or more processing units (e.g., in a multi-core configuration). Memory area 135 is any device allowing information such as executable instructions and/or other data to be stored and retrieved, and memory area 135 may include one or more computer readable media.

Computing device also includes at least one display device 150 for presenting information, such as a navigation chart, to user 105. In some implementations, display device 150 includes a display adapter (not shown), which is operatively coupled to processor 130 and operatively coupleable to a display device, such as a cathode ray tube (CRT), a liquid crystal display (LCD), an organic light emitting diode (OLED) display, and/or an electronic ink display.

In some implementations, computing device 110 includes user input device 120 for receiving input from user 105. User input device 120 may include, for example, functionally defined switches and/or buttons, a keyboard, a pointing device, a mouse, a stylus, a touch sensitive panel (e.g., a touch pad or a touch screen), a gyroscope, an accelerometer, a position detector, and/or an audio input device. A single component such as a touch screen may function as both display device 150 and user input device 120.

Stored in memory area 135 are, for example, computer readable instructions for providing a user interface to user 105 via display device 150 and, optionally, receiving and processing input from input device 120. A user interface may include, among other possibilities, a navigation application and/or a web browser.

In some implementations, memory area 135 stores a plurality of chart features. Each chart feature is associated with one or more geographic positions and/or geographic extents. A chart feature is also associated with one or more chart feature attributes. In one implementation, a navigation aid entity includes a feature type (e.g., a buoy, a beacon, a lighthouse), an identifier, a name, a set of lights color display and/or a light duration for each light, and a nominal range and/or a visibility angle for each light. Chart feature attributes may be associated with chart features in memory area 135. Chart feature attributes may include a feature attribute indicator such as one or more textual characters, a glyph, an icon, an image, and/or a graphical feature (e.g., one or more lines and/or shapes). In one implementation, processor 130 is programmed to retrieve chart features from memory area 135. For example, processor 130 may retrieve chart features based on a geographic area of a navigation chart.

In some embodiments, input device 115 includes navigation instrument interface 125. Interface 125 is coupled to a navigation instrument 155 that provides a current geographic position and/or a current geographic orientation. For example, navigation instrument 155 may provide a current geographic position and/or orientation continuously, periodically, upon request, or upon a change in a geographic position and/or a geographic orientation, and other timings are also contemplated. Navigation instrument 155 may provide a geographic position by providing absolute geographic coordinates, a position (e.g., direction and/or distance) relative to one or more chart features, and/or any other suitable means of expressing a geographic position. Navigation instrument 155 may provide a geographic orientation by providing a cardinal direction, a heading (e.g., expressed in degrees), a direction relative to a chart feature, and/or any other suitable means of expressing a geographic orientation.

In other implementations, input device 115 includes user input device 120. For example, user input device 120 may include a keyboard (not shown), with which user 105 enters a geographic position of interest, which may be expressed as absolute geographic coordinates, a city, and/or any other suitable means for indicating a geographic position, whether particularly or approximately. In another example, user input device 120 includes a pointing device (e.g., a mouse or a touch screen) configured to receive from user 105 a selection of a geographic position of interest within a map and/or a navigation chart displayed by display device 150. In addition, or alternatively, user input device 120 may include a keyboard, mouse, and/or other device with which user 105 specifies a geographic orientation. Computing device 110 may include both navigation instrument interface 125 and user input device 120.

Processor 130 is programmed to generate a navigation chart having a geographic area that corresponds to the geographic position of interest. For example, processor 130 may identify a geographic area wherein the geographic position of interest is a center point of the geographic area. In one embodiment, processor 130 determines the geographic area based also on a pixel resolution of a display device coupled to or integrated with display device 150. The navigation chart generated by processor 130 also includes a plurality of chart feature symbols corresponding to chart features that are at a geographic position within the geographic area.

In some implementations, processor 130 generates the navigation chart corresponding to both a geographic position of interest and to a geographic orientation from input device 115. For example, processor 130 may generate a navigation chart that has the geographic position of interest as a center point and rotated such that the geographic orientation extends in an upward direction from the center point. Processor 130 may be further programmed to maintain a constant rotational orientation of one or more chart feature symbols and/or labels, regardless of the geographic orientation and/or the rotation of the navigation chart. For example, a label may be maintained in a horizontal orientation to facilitate ease of reading the label.

Processor 130 may retrieve the plurality of chart features to include in the navigation chart from memory area 135. In one implementation, processor 130 is programmed to select, from memory area 135, a plurality of chart features having a geographic position within the geographic area and generate a navigation chart having a plurality of chart feature symbols corresponding to the selected chart features. Processor 130 may include in the navigation chart a chart feature symbol corresponding to a feature type of each chart feature.

Computing device 110 may produce a "live", "en route", or scrolling navigation chart. In some implementations, navigation instrument interface 125 is configured to repeatedly receive a current geographic position and/or a current geographic orientation from navigation instrument 155. For example, navigation instrument interface 125 may receive a geographic position and/or a current geographic orientation continuously, periodically, or upon a change in a geographic position and/or geographic orientation. In such implementations, navigation instrument interface 125 receives a plurality of geographic positions and/or a plurality of geographic orientations at a plurality of times. Processor 130 is programmed to generate a plurality of navigation charts based on the geographic positions and/or geographic orientations. In one aspect, processor 130 is programmed to generate a first navigation chart based on a first geographic position received at a first time, and display device 150 displays the first navigation chart. Processor 130 is also programmed to generate a second navigation chart based on a second geographic position received at a second time, and display device 150 displays the second navigation chart.

FIG. 2 illustrates an exemplary navigation chart 200 of a geographical area 202 having chart feature symbols including a plurality of navigation aid symbols 204 and a route symbol 212. In the exemplary implementation, navigation aid symbols 204 represent navigation aids that emit a light indication. For example, the navigation aids may be a beacon, a buoy and/or a lighthouse that emits a visible light. The navigation aids are configured in order to have a unique light emission that enables viewers (e.g., mariners) to identify the particular navigation aid. For example, such navigation aids may include different colored light emissions (e.g., red, yellow, green) and a particular light duration period (e.g., 2 seconds) depending upon the point from which the navigation aid is viewed. In the exemplary implementation, navigation aids may include a red light emission represented by section 206, a yellow light emission represented by section 208, and a green light emission represented by section 210. Sections 206, 208 and/or 210 may be colored according to the represented light emission. Route symbol 212 represents a route input into system 100 by user 105 or other suitable source. Route symbol 212 corresponds to a route a vehicle (e.g., ship) will travel or is travelling in geographic area 202. In the exemplary implementation, the vehicle is represented by a ship symbol 214. Additionally, navigation aid symbol 204 may be used along an edge of geographic area 202 to depict the general direction where a visible navigation aid can be viewed if the navigation chart 200 is zoomed in and that navigation aid is not located in geographic area 202.

Figure 3:
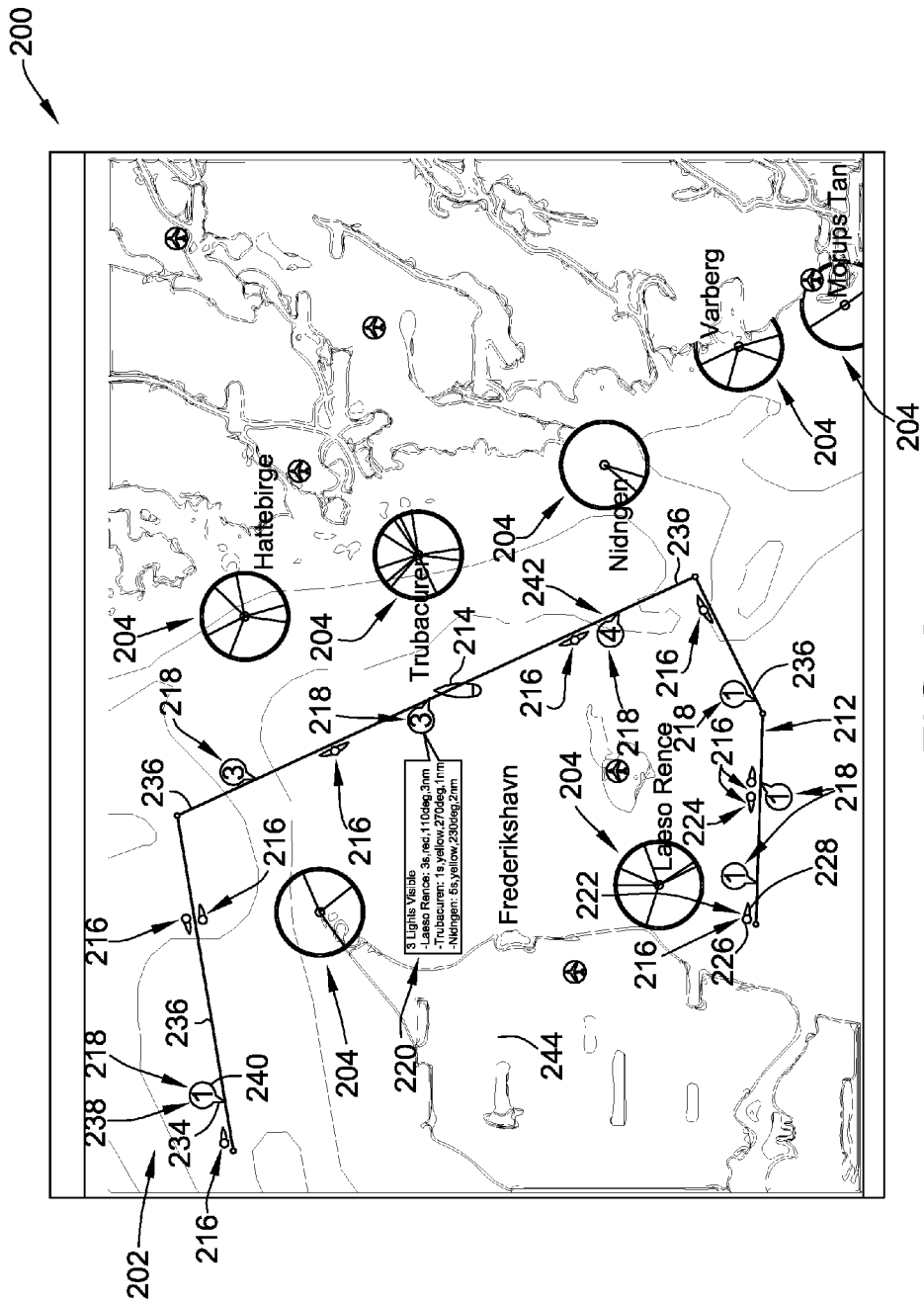
FIG. 3 is a view of the navigation chart of FIG. 2 in a lighted route mode.

FIG. 3 illustrates navigation chart 200 with a "lighted route" feature enabled. In the exemplary implementation, the lighted route feature enables user 105 to view which navigation aids will be visible along route 212 and to confirm a location along route 212. Such information is particularly helpful during night navigation when very few references are available to determine if a ship is at the correct position along the route and/or heading in the correct direction. Conventionally, in order for a mariner to confirm his position based on lighted navigation aids, the mariner must visually locate a lighted navigation aid and then consult a book that lists unique identifiers of the lighted navigation aid. The mariner must then correctly match a navigational aid entry in the book with what he is viewing in order to assist him in determining his present location. In the exemplary implementation, the lighted route feature quickly and visually provides user 105 with information related to lighted navigation aids and enables the user to identify particular navigation aids and confirm current ship location, as further described herein.

In the exemplary implementation, once the lighted route feature is enabled, computing device 110 generates a navigation chart 200 that includes at least one of an attribute transition symbol 216, a visible aids symbol 218, and an attribute label 220. Attribute transition symbol 216 represents a location along route 212 where one or more visible attributes of a particular navigation aid will change. For example, attribute transition symbol 216 may be a first transition symbol 222 or a second transition symbol 224. First transition symbol 222 is depicted by a dot 226 followed by a fading line 228 when traveling along route 212 from a start point 230 to an end point 232. First transition symbol 222 represents the ship entering into a section of route 212 from which it is possible to see a particular navigation aid light and/or attribute. Similarly, second transition symbol 224 is depicted by fading line 228 followed by dot 226 when traveling along route 212. Second transition symbol 224 represents the ship exiting from a section of route 212 from which it was possible to see a particular navigation aid light and/or attribute. Although attribute transition symbols 216 are depicted with the dot and line configuration, transition symbols 216 may have any suitable depiction that enables system 100 to function as described herein.

In the exemplary implementation, visible aids symbol 218 is positioned along a section 236 of route 212. Each section 236 is defined between two attribute transition symbols 216, and visible aids symbol 218 represents the number of navigation aids that are visible along each section 236 of route 212. For example, a visible aids symbol 238 depicts a globe 240 with the number "1" representing that the light from only one navigation aid is visible along that particular route section (i.e., one navigation aid is visible). Similarly, a visible aids symbol 242 depicts globe 240 with the number "4" representing that light from four navigation aids is visible along that particular route section (i.e., four navigations aids are visible). Although visible aids symbols 218 are depicted with the globe and number configuration, visible aids symbols 218 may have any suitable depiction that enables system 100 to function as described herein. Additionally, visible aids symbol 218 may be used along an edge of geographic area 202 to depict the direction where a visible navigation aid can be viewed if the navigation chart 200 is zoomed in and that navigation aid is not located in geographic area 202.

Figure 4:
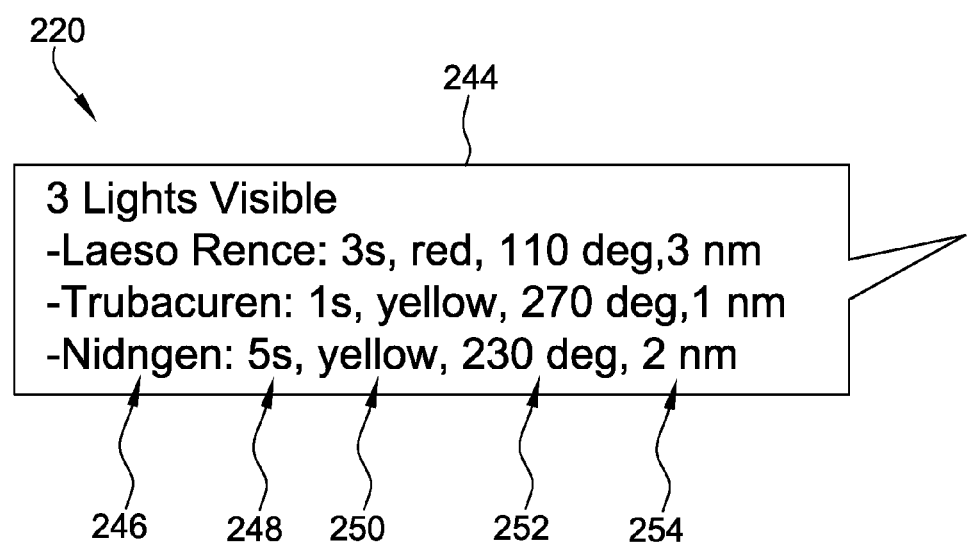
FIG. 4 is a detailed view of an attribute label shown in FIG. 3.

In the exemplary implementation, attribute label 220 is a pop-up box 244 that appears on navigation chart 200 when user 105 interacts with (e.g., clicks on, mouses over, etc.) visible aids symbol 218 or ship symbol 214. Alternatively, attribute label 220 is displayed automatically at any suitable time and in any suitable location on chart 200. Attribute label 220 provides information relating to the attributes of navigation aids that are visible along the particular section of route 212 associated with visible aids symbol 218 and/or ship symbol 214. As illustrated in greater detail in FIG. 4, exemplary attribute label 220 includes a name indicator 246, a light duration period indicator 248, a light color indicator 250, a heading indicator 252 and a nominal range indicator 254. Alternatively, attribute label 220 may include any suitable indicator or information that enables system 100 to function as described herein. For example, as shown, name indicator 246 represents an identifying name for a particular navigation aid; light duration period indicator 248 represents the light duration period in seconds for the particular navigation aid when viewed from a particular position along route 212 (e.g., the time the light is on and/or off); light color indicator 250 represents the color of the light output for the particular navigation aid when viewed from a particular position along route 212; heading indicator 252 represents a heading in degrees for which the particular navigation aid can be viewed from a particular position along route 212 (e.g., relative to the bow of the ship, a charted course, and/or cardinal directions); and nominal range indicator 254 represents the nominal range in nautical miles to the particular navigation aid from a particular position along route 212. In the exemplary implementation, visible aids symbol 218 includes a pointer 234 and user 105 may slide visible aids symbol 218 to a desired location along section 236. Attribute label 220 will then display information relating to attributes of visible navigation aids when viewed from that desired location.

In an exemplary operation, user 105 interacts with computing device 110. User 105 utilizes input device 115 and/or user input device 120 to identify a desired geographic location and/or navigation instrument 155 identifies a current geographic location. Computing device 110 receives the desired geographic location from user input device 115, 120 and/or the current geographic location from navigation instrument 155. Computing device 110 generates a navigation chart (e.g., navigation chart 200) having a geographic area 202 that corresponds to the desired geographic location and/or the current geographic location. Navigation chart 200 includes at least one navigation aid symbol 204 that corresponds to a position of a navigation aid located within geographic area 202. In the exemplary implementation, navigation aid symbol 204 includes at least one of red section 206, yellow section 208, and green section 210 that each correspond to the color of light displayed by the navigation aid in various directions. Computing device 110 then displays navigation chart 200 on display device 150.

In the exemplary implementation, user 105 may enter a desired route of travel along navigation chart 200 into computing device 110 via input device 115 and/or 120. Computing device 110 generates a route symbol 212 corresponding to the desired route within geographic area 202 and may generate a ship symbol 214 corresponding to the present location of a ship within geographic area 202. Alternatively, computing device 110 receives a desired route from another source and/or the desired route may be preloaded into memory area 135. Computing device 110 then determines which navigation aids are visible throughout each position within geographic area 202. For example, in the exemplary implementation, processor 130 uses an algorithm contained in memory area 135, cartographic database 140 and/or navigation aid database 145 to determine whether each navigation aid is visible from predetermined positions within geographic area 202.

Computing device 110 may also determine which navigation aids are visible from each point along plotted route 212. As a ship travels along route 212, an attribute of the light visible from each navigation aid may change. For example, the light color may change from red to green or the light period duration may change from one second to three seconds. Additionally, during travel along route 212, navigation aids may fade from view or come into view. In the exemplary implementation, computing device 110 generates at least one attribute transition symbol 216 that corresponds to a visible attribute change of a navigation aid when viewed from a particular position along route 212. As such, attribute transition symbol 216 alerts user 105 of a visible attribute change at that predetermined position along the route. This enables user 105 to confirm the attribute change, which confirms that the ship is heading in the correct direction and/or along the desired route. Further, attribute transition symbol 216 may include dot 226 and fading line 228 to depict the type of attribute change. In the exemplary implementation, fading line 228 followed by dot 226 indicates that the ship will lose sight of a specific navigation aid attribute (e.g., exiting from a visible red light or exiting from a visible light altogether), and dot 226 followed by fading line 228 indicates that the ship will gain sight of a specific navigation aid attribute (e.g., entering into view of a yellow light or entering into view of a light from a new navigation aid).

Computing device 110 may also determine the number of navigation aids visible along each section 236 of route 212. As a ship travels along route 212, light from navigation aids may come into and/or out of view. Each section 236 is defined between a pair of attribute transition symbols 216. In the exemplary implementation, computing device 110 generates at least one visible aids symbol 218 that corresponds to the number of navigation aids visible from a specific route section 236. As such, visible aids symbol 218 alerts user 105 as to how many navigation aids should be visible along a predetermined section of the route. This enables user 105 to visually confirm the number of visible navigation aids, which confirms that the ship is heading in the correct direction and/or along the desired route.

Computing device 110 may also display various attributes of each navigation aid at a specific point along route 212. In the exemplary implementation, computing device generates at least one attribute label 220 when user 105 interacts with visible aids symbol 218, ship symbol 214, and/or upon the occurrence of another event. For example, when user 105 clicks on visible aids symbol 218, attribute label 220 appears as pop-up box 244 and provides attribute information related to each navigation aid visible from each route section 236. Attribute label 220 may provide name indicator 246, period indicator 248, color indicator 250, heading indicator 252, and/or nominal range indicator 254 that each provide information corresponding to each named visible navigation aid. Further, visible aids symbol 218 may include pointer 234 attached to a specific location along route section 236. User 105 may interact with visible aids symbol 218 to translate pointer 234 along route 212 to a specific desired location such that attribute label 220 will provide attribute information specific to that desired location.

As described herein, systems and methods are provided that determine which, if any, navigation aids in a geographic area are visible from specific points within that geographic area. As such, a navigation chart may be automatically generated that displays navigation aids and their attributes when viewed from any given location within the geographic area. Specifically, the navigation chart includes defined routes, symbols and/or labels to help a user to quickly and safely identify navigation aids and confirm present location and/or heading via the generated navigation chart. The generated navigation chart improves ship and personnel safety during navigation and instantly provides detailed information about surrounding navigation aids. The systems and methods provided herein are particularly useful for assisting a user during night time navigation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for generating a navigation chart, said system comprising:
   a display device; and
   a computing device coupled to said display device, said computing device configured to:
      receive at least one of current geographic position data from a navigation instrument and a desired geographic position input by a user;
      generate a navigation chart having a geographic area that corresponds to one of the current geographic location and the desired geographic position and that includes at least one navigation aid, said navigation chart includes at least one navigation aid symbol corresponding to a position of the navigation aid within the geographic area;
      determine whether each navigation aid is visible at a predetermined position within the geographic area;
      receive a route along the geographic area;
      determine where a navigation aid attribute transition will occur along the route;
      generate at least one attribute transition symbol corresponding to the navigation aid attribute transition at a predetermined position along the route; and
      display the navigation chart including the at least one navigation aid symbol and the at least one attribute transition symbol on said display device.

2. The system of claim 1, wherein said computing device is further configured to:
   generate a route symbol corresponding to the received route; and
   determine whether each navigation aid is visible at a predetermined position along the route.

3. The system of claim 1, wherein the navigation aid attribute transition is one of leaving an area where one of the navigation aids is visible, entering an area where one of the navigation aids is visible, one of the navigation aids changing a display color, and one of the navigation aids changing a display period.

4. The system of claim 2, wherein said computing device is further configured to:
determine how many of the navigation aids are visible along a predetermined section of the route; and
generate at least one visible aids symbol, wherein each visible aid symbol corresponds to a number of navigation aids visible along the predetermined section of the route.

5. The system of claim 4, wherein said computing device is further configured to generate at least one attribute label that corresponds to at least one attribute of the navigation aid with respect to a predetermined position along the route.

6. The system of claim 5, wherein the at least one attribute is at least one of a number of visible navigation aids, a name of visible navigation aids, a period of visible navigation aids, a color of visible navigation aids, a degree heading of visible navigation aids, and a distance of visible navigation aids.

7. The system of claim 4, where the at least one visible aids symbol is movable along the route to a predetermined point and corresponds to a number of navigation aids visible at the predetermined point along the route.

8. A device for generating a navigation chart, said device comprising:
a display device;
an input device configured to receive a geographic location of interest and a route along a geographic area; and
a processor coupled to said input device and programmed to:
generate a navigation chart having the geographic area that corresponds to the geographic location of interest and that includes at least one navigation aid, said navigation chart includes at least one navigation aid symbol corresponding to a position of the navigation aid within the geographic area;
determine whether each navigation aid is visible at a predetermined position within the geographic area;
determine where a navigation aid attribute transition will occur along the route;
generate at least one attribute transition symbol corresponding to the navigation aid attribute transition at a predetermined position along the route; and
display the navigation chart including the at least one navigation aid symbol and the at least one attribute transition symbol on said display device.

9. The device of claim 8, wherein said processor is further configured to generate a route symbol corresponding to the received route and determine whether each navigation aid is visible at a predetermined position along the route.

10. The device of claim 9, wherein said processor is further configured to:
determine how many of the navigation aids are visible along a predetermined section of the route; and
generate at least one visible aids symbol, wherein each visible aid symbol corresponds to a number of navigation aids visible along the predetermined section of the route.

11. The device of claim 10, wherein said processor is further configured to generate at least one attribute label that corresponds to at least one attribute of the navigation aid with respect to a predetermined position along the route.

12. The device of claim 11, wherein the at least one attribute is at least one of: a number of visible navigation aids, a name of visible navigation aids, a period of visible navigation aids, a color of visible navigation aids, a degree heading of visible navigation aids, and a distance of visible navigation aids.

13. The device of claim 8, wherein the navigation aid attribute transition is one of leaving an area where one of the navigation aids is visible, entering an area where one of the navigation aids is visible, one of the navigation aids changing a display color, and one of the navigation aids changing a display period.

14. A computer-implemented method for generating a navigation chart having at least one navigation aid, said method implemented using a computing device coupled to a display device, said method comprising:
determining a geographic area of interest;
generating, by the computing device, a navigation chart having a geographic area that corresponds to the geographic area of interest and that includes at least one navigation aid;
generating, by the computing device, at least one navigation aid symbol corresponding to a position of the navigation aid within in the geographic area;
determining whether each navigation aid is visible at a predetermined position within the geographic area;
receiving a route along the geographic area;
determining where a navigation aid attribute transition will occur along the route;
generating, by the computing device, at least one attribute transition symbol corresponding to the navigation aid attribute transition at a predetermined position along the route; and
displaying the navigation chart including the at least one navigation aid symbol and the at least one attribute transition symbol on a display device.

15. The computer-implemented method of claim 14, further comprising:
generating a route symbol corresponding to the received route; and
determining whether each navigation aid is visible at a predetermined position along the route.

16. The computer-implemented method of claim 15, further comprising:
determining how many navigation aids are visible along a predetermined section of the route; and
generating at least one visible aids symbol, wherein each visible aid symbol corresponds to a number of navigation aids visible along the predetermined section of the route.

17. The computer-implemented method of claim 16, further comprising generating at least one attribute label, wherein each attribute label corresponds to at least one attribute of the navigation aid with respect to a predetermined position along the route.

18. A system for generating a navigation chart, said system comprising:
a display device; and
a computing device coupled to said display device, said computing device configured to:
receive at least one of current geographic position data from a navigation instrument and a desired geographic position input by a user;
generate a navigation chart having a geographic area that corresponds to one of the current geographic location and the desired geographic position and that includes at least one navigation aid, said navigation chart includes at least one navigation aid symbol corresponding to a position of the navigation aid within the geographic area;

determine whether each navigation aid is visible at a predetermined position within the geographic area;

determine how many of the navigation aids are visible along a predetermined section of the route;

generate at least one visible aid symbol, wherein the at least one visible aid symbol is movable along the route to a predetermined point and corresponds to a number of navigation aids visible at the predetermined point along the route; and display the navigation chart including the at least one navigation aid symbol and the at least one visible aid symbol on said display device.

\* \* \* \* \*